United States Patent [19]

Glöeckler et al.

[11] Patent Number: 4,825,228

[45] Date of Patent: Apr. 25, 1989

[54] METHOD OF, AND APPARATUS FOR, REGULATING INK VISCOSITY IN AN INK JET PRINTING SYSTEM

[76] Inventors: Gerhard Glöeckler, Ringstrasse 1, 7769 Orsingen; Klaus Schrodin, Allmannsdorferstrasse 61, 7750 Konstanz, both of Fed. Rep. of Germany

[21] Appl. No.: 23,270

[22] Filed: Mar. 9, 1987

[30] Foreign Application Priority Data

Mar. 17, 1986 [CH] Switzerland ........................ 1070/86

[51] Int. Cl.[4] ...................... G01D 15/18; G05D 11/00

[52] U.S. Cl. ....................................... 346/1.1; 346/75; 346/140 R; 13/452; 137/92; 137/93; 137/398

[58] Field of Search ...................... 346/1.1, 75, 140 R; 137/389, 398, 92, 93

[56] References Cited

U.S. PATENT DOCUMENTS

| | | | |
|---|---|---|---|
| 3,835,881 | 9/1974 | Dal et al. | 137/389 |
| 4,067,020 | 1/1978 | Arway | 346/75 |
| 4,422,085 | 12/1983 | Sumitomo et al. | 346/140 R |

FOREIGN PATENT DOCUMENTS

| | | |
|---|---|---|
| 3111987 | 1/1982 | Fed. Rep. of Germany . |
| 2393294 | 12/1978 | France . |

OTHER PUBLICATIONS

Publication by J. W. Haskell entitled "Ink Concentration Monitor", published in IBM Technical Disclosure Bulletin, vol. 20, No. 2, pp. 569 to 570, Jul. 1977.

*Primary Examiner*—Joseph W. Hartary
*Assistant Examiner*—Gerold E. Preston

[57] ABSTRACT

The ink jet printing system contains at least one ink jet printing head operatively connected to printing medium reservoirs by a conduit system. A partial ink flow is passed through a regulating apparatus for viscosity-dependent regulation. On exceeding the ink viscosity or ink density, a spindle body constructed as a float contacts a switch constructed as a proximity switch. The switch is operated such that a corresponding signal is supplied to a control valve and as a result the supply of solvent to a main ink reservoir of the printing medium reservoirs is initiated. The regulating apparatus may constitute an independent assembly associated with the main ink reservoir or can be integrated into the main ink reservoir.

17 Claims, 2 Drawing Sheets

METHOD OF, AND APPARATUS FOR, REGULATING INK VISCOSITY IN AN INK JET PRINTING SYSTEM

BACKGROUND OF THE INVENTION

The present invention relates to a new and improved method of, and apparatus for, regulating the ink viscosity in an ink jet printing system.

In its more particular aspects, the present invention specifically relates to a new and improved method of, and apparatus for, regulating the ink viscosity in an ink jet printing system containing at least one ink jet printing or spraying head. Ink droplets are formed in the ink jet printing or spraying head which are electrically charged and deflected during an ink jet printing operation. Printing ink is supplied to the ink jet printing head from associated medium reservoirs and through an operatively connected line or conduit system.

In known ink jet printing systems the dynamic viscosity or internal friction of the ink is an essential factor affecting the operating reliability of the ink jet printing system. Due to the necessary continuous suction applied at the drop catcher or ink droplet catch gutter by means of a suction pump, there is also sucked in a considerable amount of air from the environment. In addition, an overpressure builds up in the main ink reservoir which requires deaeration which, in turn, influences the ink viscosity. Simultaneously with such deaeration of the main ink reservoir or tank, solvent vapors pass into the environment which, in turn, leads to a change in the ink viscosity. As soon as the permitted viscosity range of the ink is exceeded, i.e. the ink becomes more viscous, satisfactory ink drop formation as well as the charging and deflection of the ink drops and consequently a satisfactory printing function are no longer ensured.

SUMMARY OF THE INVENTION

Therefore, with the foregoing in mind it is a primary object of the present invention to provide a new and improved method of, an apparatus for, regulating ink viscosity in an ink jet printing system and which method and apparatus do not exhibit the aforementioned drawbacks and shortcomings of the prior art ink jet printing systems.

Another and more specific object of the present invention aims at providing a new and improved method of, and apparatus for, regulating ink viscosity in an ink jet printing system and which method and apparatus prevent, particularly during an ink jet printing operation, variations in the ink viscosity of the printing ink.

Now in order to implement these and still further objects of the invention, which will become more readily apparent as the description precedes, the ink viscosity regulating method of the present development is manifested by the features that, during the ink feeding phase during which printing ink is fed to the ink jet printing head, there is simultaneously passed a partial ink flow through a regulating means or device which acts or is effective as a function of the ink viscosity. When a predetermined ink viscosity is exceeded, the regulating means or device actuates associated switch means. A signal generated by the switch means is delivered to a control valve which controls the infeed of solvent to the main ink reservoir and thereby changes the ink viscosity.

As alluded to above, the invention is not only concerned with the aforementioned method aspects, but also relates to a novel construction of an apparatus for carrying out the same. Generally speaking, the inventive apparatus comprises at least one ink jet printing head which is constructed for generating ink droplets and for electrically charging and deflecting such ink droplets during an ink jet printing operation. Printing ink is supplied to the ink jet printing head from associated medium reservoirs through an operatively connected system of conduits.

To achieve the aforementioned measures, the inventive apparatus, in its more specific aspects, comprises:

regulating means containing a housing which is connected to the ink feed system;

a spindle body which is arranged in the housing and constructed as a float; and the spindle body being operatively associated with switch means and being operatively disassociated from such switch means by substantially upwardly and downwardly directed movements as a function of the ink viscosity or ink density.

BRIEF DESCRIPTION OF THE DRAWINGS

The invention will be better understood and objects other than those set for above will become apparent when consideration is given to the following detailed description thereof. Such description makes reference to the annexed drawings wherein through out the various figures of the drawings they have been generally used the same reference characters to denote the same or analogous components and wherein.

r

Figure 4:
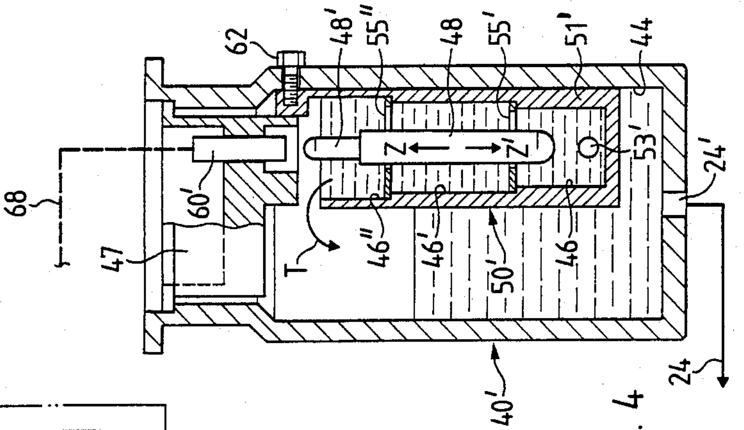
Figure 3:
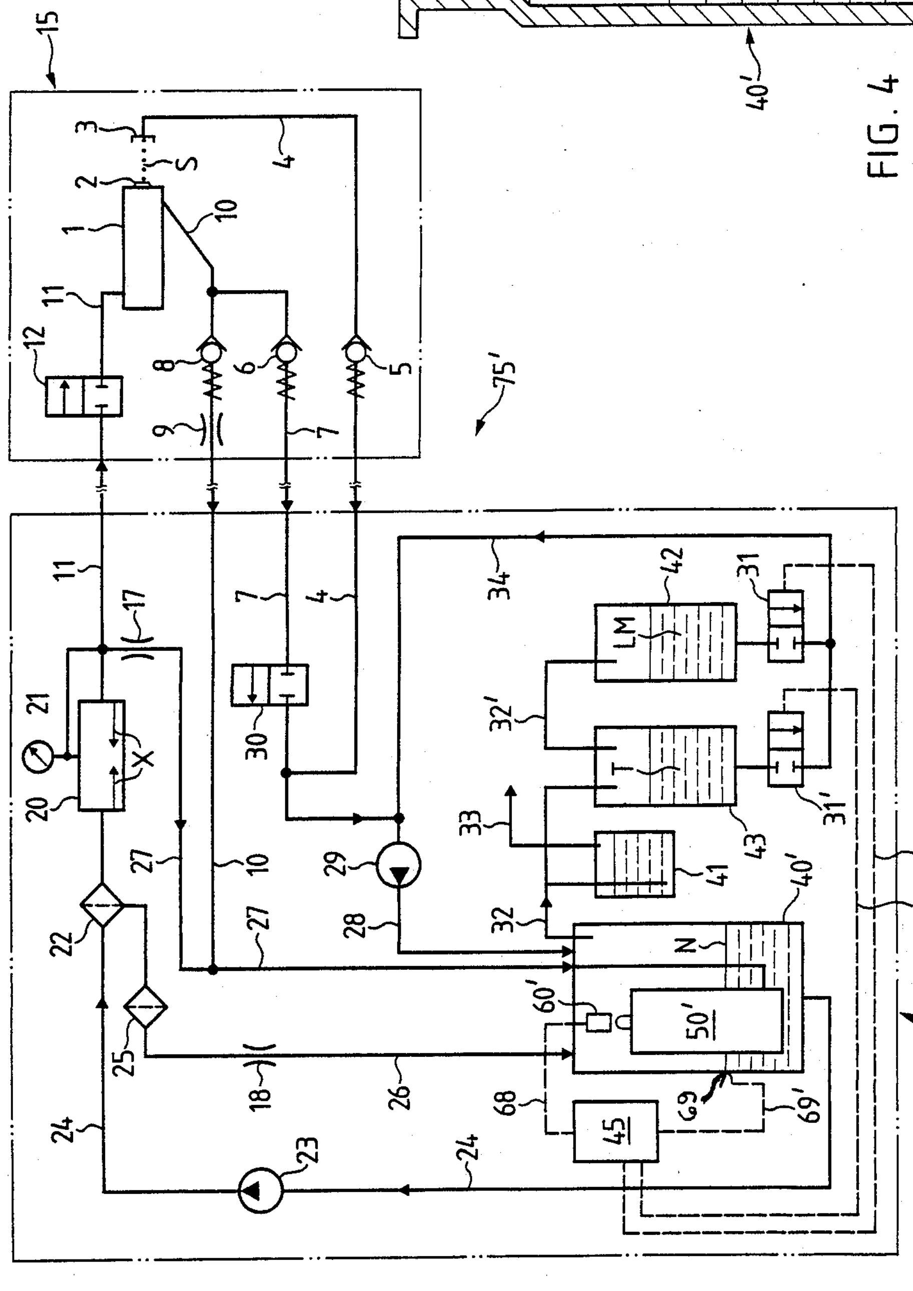

FIG. 3 is a diagrammatic block circuit diagram illustrating a further ink jet printing system containing a second exemplary embodiment of the inventive ink viscosity regulating means; and FIG. 4 is a schematic sectional view of the main ink reservoir and the regulating means integrated into the main ink reservoir in the ink jet printing system shown in FIG. 3.

DETAILED DESCRIPTION OF THE PREFERRED EMBODIMENTS

Describing now the drawings, it is to be understood that only enough of the construction of the inventive ink jet printing apparatus has been shown as needed for those skilled in the art to readily understand the underlying principles and concepts of the present development, while simplifying the showing of the drawings. Turning attention now specifically to FIG. 1 of the drawings, the ink jet printing system illustrates therein by way of example and not limitation will be seen to be designated in its entirety by the reference character 75 and to be illustrated in a diagrammatic block circuit diagram. The ink jet printing system 75 specifically constitutes an ink feed system for an ink jet printing or spraying head generally designated by the reference character 15 and a control console or cabinet 70 which is equipped with the means required for building up the pressure for the ink jet printing operations.

Figure 1:
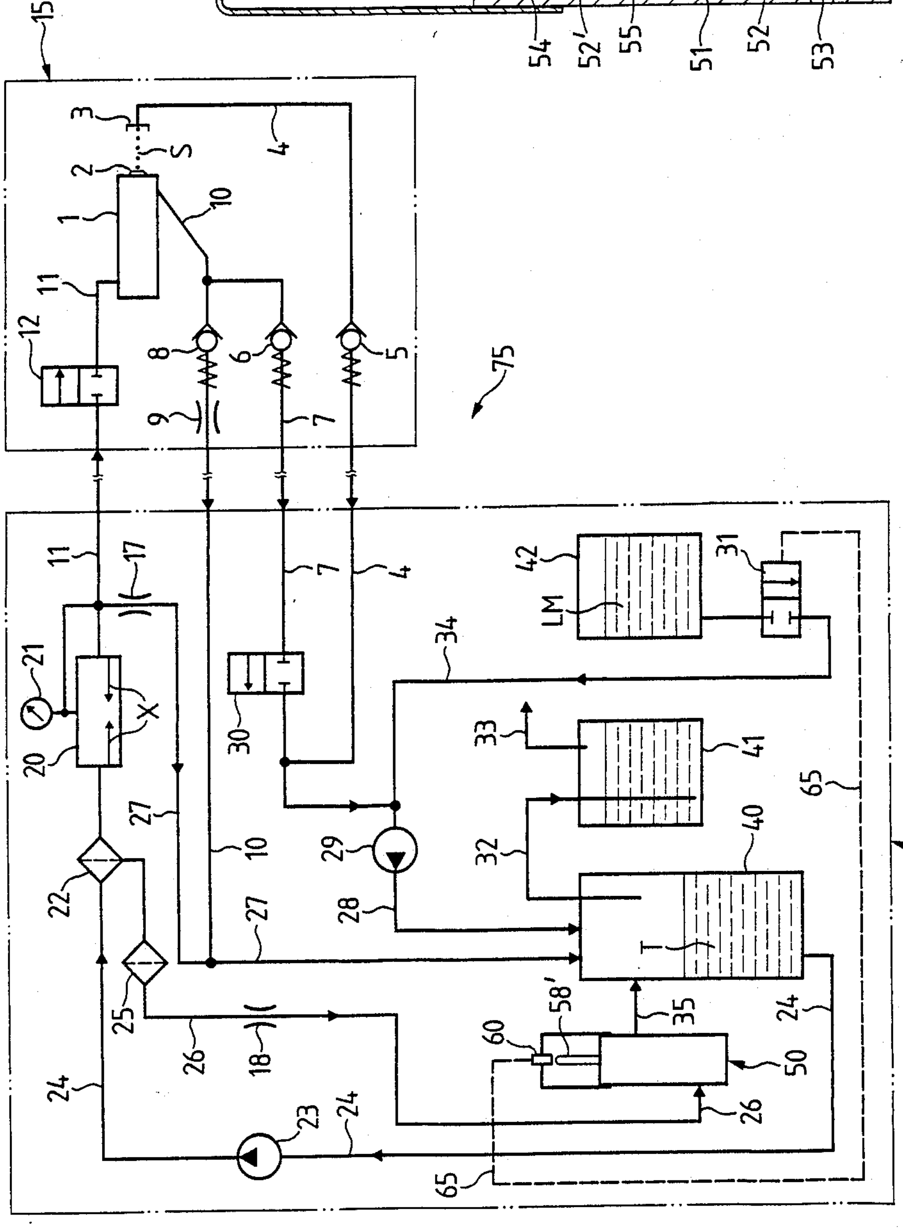
FIG. 1 is a diagrammatic block circuit diagram showing an ink jet printing system containing a first exemplary embodiment of the inventive ink viscosity regulating means.

The ink jet printing head 15 is diagrammatically illustrated as a block in FIG. 1 and essentially encompasses a nozzle body 1 containing a nozzle orifice 2 and conventional and therefore not here further illustrated means for electrically charging and deflecting ink drops or droplets of the ink jet S. There are further provided a drop catcher or ink droplet catch gutter 3, an ink feed valve 12, check valves 5, 6 and 8, as well as throttle means 9. The aforementioned individual components of the ink jet printing or spraying head 15 are operatively connected to the individual components arranged in the control console or cabinet 70 by means of ink-carrying lines or conduits 11, 10, 7 and 4.

In the control console or cabinet 70, which is also diagrammatically shown as a block, there is provided a main ink reservoir or tank 40, a water container 41 and a regulating means or device 50 which is in the form of an independent constructional unit and essentially is associated with the main ink reservoir or tank 40. There will be further recognized in the control console or cabinet 70 a pressure reducing valve 20 which is operatively connected to a pressure gauge 21 and regulates the operating pressure according to the directions of the arrows X, a first filter 22, a pressure pump 23, a second filter 25, two throttle means 17 and 18, a suction pump 29, a first or vent control valve 30 and a second control valve 31 which is associated with a solvent reservoir or container 42.

The pressure reducing valve 20 is connected on one side via a line or conduit 11 to the ink jet printing or spraying head 15 and is operatively connected on an other side through an ink feed line or conduit 24 to the main ink reservoir or tank 40 via the first filter 22 and the pressure pump 23. The main ink reservoir or tank 40 is further connected via an ink return line or conduit 35 to the regulating means or device 50 as well as, via a line or conduit 27 and the interposed throttle means 17, to the pressure gauge 21 provided at the pressure reducing valve 20. The line or conduit 10 is connected to the nozzle body 1 with the interposition of the check valve 8 and the throttle means 9 and opens into the line or conduit 27. The line or conduit 7 connected to the line or conduit 10 upstream of the check valve 8, and the line or conduit 4 connected to the drop catcher or ink droplet catch gutter 3, are connected to the first or vent control valve 30.

The first or vent control valve 30 and the line or conduit 4 are connected to a line or conduit 34 communicating with the solvent reservoir or container 42 and the line or conduit 34, in turn, is connected via the suction pump 29 to a line or conduit 28 connected to the main ink reservoir or tank 40. The main ink reservoir or tank 40 is further connected, via a line or conduit 32, to a water container 41 for solvent separation and a vent line 33 is connected to the water container 41. With the interposition of the second filter 25, which constitutes a line or conduit filter, and the throttle means 18, an ink supply line or conduit 26 leads to the regulating means or device 50 from the first filter 22 connected in the ink feed line or conduit 24. In fact, the ink supply line or conduit 26 supplies ink to the regulating means or device 50 and branches off from the ink feed line or conduit 24 through which ink is fed from the main ink reservoir or tank 40 to the ink jet printing or spraying head 15.

Figure 2:
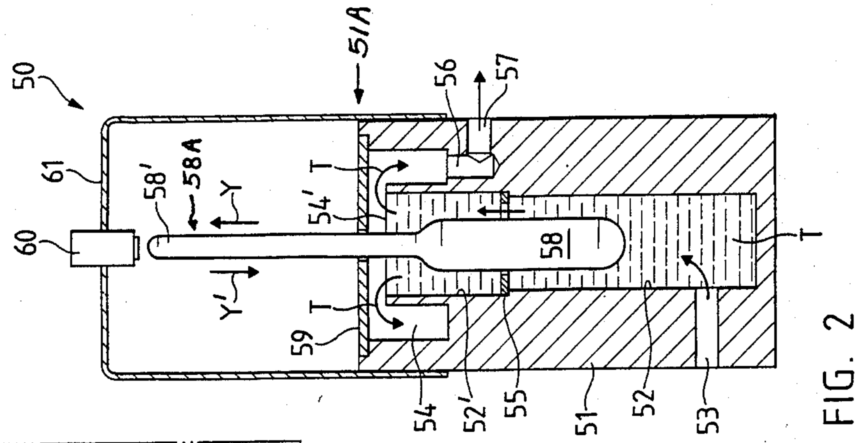
FIG. 2 is a schematic sectional view of the regulating means used in the ink jet printing system illustrated in FIG. 1.

FIG. 2 shows on a larger scale and in sectional view the regulating means or device 50 which is constructed as an independent constructional unit and which will be described hereinafter:

The regulating means or device 50 contains a container 51 constructed as a housing with a stepped recess or cavity 52, 52' in which there is arranged a spindle body 58, which is constructed as a float, provided in a top portion 58A with a push rod 58' and centrally guided by means of a ring 55. In the upper area, the container or housing 51 has an annular channel or duct 54 and is closed by a cover 59. The annular channel or duct 54 is connected to an outlet aperture 57 by means of a housing bore 56. The outlet aperture 57 is constructed for receiving and fixing the ink return line or conduit 35 which connects he regulating means or device 50 to the main ink reservoir or tank 40, see FIG. 1. An opening 53 is provided in the lower area of the container or housing 51 for receiving and fixing the ink supply line or conduit 26. In the upper area of the container or housing 51 there is also arranged and fixed, by using conventional and therefore not here illustrated means, a vertically adjustable retaining clip or bracket 61 for a switch or switch means 60.

The basic operation of the aforementioned ink jet printing system is known per se so that only the essential operational steps will be described hereinafter:

By means of the pressure pump 23, ink T is supplied from the main ink reservoir or tank 40 via the ink feed line or conduit 24, the first filter 22, the pressure reducing valve 20 and the ink line or conduit 11 to the ink jet printing or spraying head 15. Upon reaching the necessary operating pressure, the ink feed valve 12 is opened so that pressure builds up in the nozzle body 1. A conventional, not illustrated vibrating plunger produces the ink jet S and conventional not specifically shown means produce a plurality of ink drops or droplets which are deflected in a predetermined direction. The not required and not deflected ink drops or droplets are caught by the drop catcher or ink droplet catch gutter 3 and returned to the main ink reservoir or tank 40 through the action of the suction pump 29.

The ink column which is present in the ink line or conduit 7 between the check valve 6 and the first or vent control valve 30 upon a turn-off action, is passed via the ink line or conduit 7, the suction pump 29 and the line or conduit 28 into the main ink reservoir or tank 40. The check valve 6 ensures that, in the case of a geodetic gradient between the first or vent control valve 30 and the nozzle body 1, no ink is forced in the direction of the nozzle body 1.

For a regulating operation as a function of the ink viscosity or density, the first filter 22 passes or branches-off from the entire ink flow a partial ink flow through the ink supply line or conduit 26 into the container or housing 51 of the regulating means or device 50. For flow and buoyancy reasons, the ink introduction is effected substantially horizontally through the opening 53 into the lower recess or cavity 52 which is constructed as a through flow channel. During this operation, as shown in FIG. 2, the ink T rises up to a weir-like top edge or rim portion 54' of the annular channel or duct 54. The top edge or rim portion 54' thus defines an ink level at substantially constant height. The ink T flowing in the direction of the arrows and over the top edge or rim portion 54' into the annular channel or duct 54, is returned through the housing bore 56 and the outlet H aperture 57 and the ink return line or conduit 35 into the main ink reservoir or tank 40.

The spindle body 58, which is arranged in the recess or cavity 52 constructed as a flow channel and centered by means of the ring 55, is rheologically constructed such that, under the conditions of substantially constant ink viscosity or density and rising ink T, the spindle body 58 assumes a predetermined position. The spacing between the switch or switch means 60, which constitutes a proximity switch, and push rod 58' can be varied by means of the retaining clip or bracket 61 which is arranged in an adjustable and fixable manner at the container or housing 51 and is set prior to starting up the ink jet printing system.

If the ink viscosity or density varies, particularly the ink viscosity increases, then, the spindle body 58 is subject to a buoyancy action in the direction of the arrow Y. When the plunger 58' contacts or engages, in other words is operatively associated with the switch means or proximity switch 60, this switch means or proximity switch 60 triggers a related signal.

The signal triggered by the switch means or proximity switch 60 is fed, by means of the electric line or conductor 65 shown as a broken line in FIG. 1, to the second control valve 31 arranged at the solvent reservoir or container 42. As a result, the second control valve 31 is opened so that the suction pump 29 delivers solvent LM through the line or conduit 34 to the main ink reservoir or tank 40 and consequently the ink viscosity is changed. The solvent LM causes a dilution of the ink present in the line or conduit system so that the spindle body 58 drops in the direction of arrow Y', see FIG. 2. As soon as the push rod 58' is disengaged or becomes operatively disassociated from the switch means or proximity switch 60, the second control valve 31 is closed again by a related signal and the solvent supply to the main ink reservoir or tank 40 is interrupted.

This ink-viscosity regulating operation can be repeated at random

FIG. 3 shows, in combination with a second exemplary embodiment of the inventive ink viscosity regulating method and apparatus, an ink supply system generally designated by the reference character 75' and essentially containing the ink jet printing or spraying head 15 and, in deviation from FIG. 1, a control console or cabinet 70'. The ink jet printing or spraying head 15 encompasses the aforementioned components or members 1 to 12 and is substantially identical with the ink jet printing or spraying head 15 shown in FIG. 1. The components or members 20 to 34 and 41 and 42 in the control console or cabinet 70' are substantially the same as the components or members designated by the same reference numerals and arranged in the control console or cabinet 70 shown in FIG. 1. In deviation from the control console or cabinet 70 shown in FIG. 1, the control console or cabinet 70' according to FIG. 3 contains a regulating means or device 50' which is integrated into a main ink reservoir or tank 40'. Additionally, there are provided a common interrogation means or device 45 which is operatively associated with the regulating means or device 50' and a further control valve 31' connected to an ink storage tank or further ink reservoir 43.

FIG. 4 shows schematically and at a larger scale, a sectional view of the regulating means or device 50' which is integrated with the main ink reservoir or tank 40' and which will now be described as follows:

The regulating means or device 50' possesses a container 51' constructed as a housing and engaging an inner wall 44 of the main ink reservoir or tank 40'. A top portion of the container or housing 51' is secured by means of bolts 62. The container or housing 51' is provided with stepped recesses or cavities 46, 46' and 46''. The recess or cavity 46' contains a first centering ring 55', and the recess or cavity 46'' contains a second centering ring 55''. The centering rings 55' and 55'' substantially centrally guide a spindle body 48 in the recesses and cavities 46, 46' and 46'' in the direction of the arrows Z and Z'. In the lower area of the container or housing 51' there is provided an opening 53' for connection with the ink line or conduit 27, see FIG. 3. In the lower area of the main ink reservoir or tank 40' there is further provided an opening 24' for connection with the ink feed line or conduit 24, see FIG. 3.

The upper area of the main ink reservoir or tank 40' contains an insert element 47 constructed for receiving a switch means or proximity switch 60' which is vertically adjustable in conventional and therefore not here particularly illustrated manner. The insert element 47 simultaneously serves as a closure means for the main ink reservoir or tank 40'.

The mode of operation of the ink jet printing system in conjunction with the regulating means or device 50' is substantially identical to the aforedescribed operation of the regulating means or device 50. Differing from the control console or cabinet 70 shown in FIG. 1, the control console or cabinet 70' according to FIG. 3 additionally contains the common interrogation means or device 45 and the ink storage tank or further ink reservoir 43. The common interrogation means or device 45 is operatively connected via an electric line or conductor 69' and only schematically indicated ink level monitoring means 69 to the main ink reservoir or tank 40'.

Using the ink level monitoring means 69, the ink level N in the main ink reservoir or tank 40' is monitored, the refilling operation regulated and an overfill prevented. As soon as the ink level N in the main ink reservoir or tank 40' drops and the switch means or proximity switch 60' is not contacted or operated upon, the common interrogation means or device 45 supplies a related signal through an electric line or conductor 67 to the further control valve 31' arranged on the ink storage tank or further ink reservoir 43 and ink is fed into the main ink reservoir or tank 40' by means of the suction pump 29 through the line or conduit 34 until the necessary or monitored ink level N is reached.

In the case of a viscosity change in the ink T, e.g. due to evaporation of the solvent LM, the spindle body 48 is upwardly displaced in the direction of the arrow Z. When the push rod 48' of the spindle body 48 operates or acts upon the switch means or proximity switch 60', such switch means or proximity switch 60' triggers a signal which is supplied via an electric line or conductor 68 to the common interrogation means or device 45. The common interrogation means or device 45 supplies, by means of a further electrical line or conductor 66, to the second control valve 31 provided at the solvent reservoir or container 42, a signal which opens such second control valve 31. The suction pump 29 then delivers solvent to the main ink reservoir or tank 40' via the lines or conduits 34 and 28 and, consequently, the ink viscosity is changed. The solvent LM brings about the change in the ink viscosity so that the spindle body 48 moves downwardly in the direction of arrow Z' and the push rod 48' no longer acts upon the switch means or proximity switch 60'. Through a corresponding signal, the second control valve 31 is reclosed and the solvent supply to the main ink reservoir or tank 40' is interrupted again.

It is noted at this point that the not particularly designated arrows at the individual medium-carrying lines or conduits shown in FIGS. 1 and 3, essentially indicate the flow direction of the particular medium carried by the particular line or conduit.

The apparatus and the method described hereinbefore lead to a regulation of the ink viscosity ensuring a substantially trouble-free printing operation of the ink jet printing system by utilizing the ink viscosity or density as the controlled variable.

While there are shown and described present preferred embodiments of the invention, it is to be distinctly understood that the invention is not limited thereto, but may be otherwise variously embodied and practiced within the scope of the following claims.

Accordingly, what we claim is:

1. A method of regulating the ink viscosity in an ink jet printing system containing an ink jet printing head, a main ink reservoir, a solvent reservoir, a conduit interconnecting said main ink reservoir and said solvent reservoir, and a control valve governing said conduit, said method comprising the steps of:

feeding ink of a predetermined ink viscosity to the ink jet printing head for generating ink droplets to be electrically charged and deflected during an ink jet printing operation;

during said step of feeding said ink to said ink jet printing head, branch-off a partial ink flow;

returning to the main ink reservoir said branch-off partial ink flow through regulating means through which flows the branch-off partial ink flow in a predetermined flow direction;

positionally adjusting, in said regulating means during said branched-off partial ink flow, a floating spindle body in and opposite to said predetermined flow direction in response to variations in the ink viscosity in said branched-off partial ink flow;

sensing a predetermined position of said floating spindle body in said regulating means which indicative of an ink viscosity which exceeds said predetermined ink viscosity; and regulating said ink viscosity by operating said control valve in said predetermined position of said floating spindle body and passing the solvent from said solvent reservoir through said control valve into the main ink reservoir as long as the ink viscosity in said branched-off ink flow exceeds said predetermined ink viscosity.

2. The method as defined in claim 1, further including the steps of:

sensing by means of an ink level sensor, the ink level in said main ink reservoir which is connected to a further ink reservoir through a further control valve;

regulating said ink level in said main ink reservoir by operating said further control valve and passing ink from said further ink reservoir through said further control valve into said main ink reservoir when said ink level sensor senses a reduced ink level below a predetermined ink level in said main ink reservoir; and using common interrogation means for interrogating said ink level sensor and said ink viscosity regulating means in order to sense the conditions for said steps of regulating said ink viscosity and said ink level in said main ink reservoir.

3. The method as defined in claim 1, further including the steps of:

arranging said regulating means within said main ink reservoir.

4. The method as defined in claim 2, further including the steps of:

arranging said regulating means within said main ink reservoir.

5. An apparatus for regulating ink viscosity in an ink jet printing system containing, a main ink reservoir holding printing ink of a predetermined ink viscosity, an ink jet printing head operatively connected through an ink feed line to said main ink reservoir for producing ink droplets for an ink jet printing operation, electrical charging and deflecting means operatively associated with said ink jet printing head for electrically charging and deflecting ink jet droplets produced by said ink jet printing head, a solvent reservoir containing a solvent for diluting said printing ink to said predetermined ink viscosity, a conduit interconnecting said solvent reservoir and said main ink reservoir, and a control valve governing said conduit interconnecting said solvent reservoir and said main ink reservoir, said regulating apparatus comprising:

a housing separated from the printing ink held in the main ink reservoir;

an ink supply conduit branching off a partial ink flow from the ink feed line which operatively connects said ink jet printing head and said main ink reservoir;

said ink supply conduit being connected to said housing;

said housing containing a cavity defining a throughflow channel having predetermined throughflow direction for the branched-off partial ink flow;

an ink return conduit interconnecting said housing and said main ink reservoir;

a spindle body;

said spindle body being floatingly arranged in said throughflow channel of said housing and being positionally adjustable in said throughflow channel, during said branched-off partial ink flow, in and opposite to said predetermined flow direction in response to variations in the ink viscosity of said branched-off partial ink flow flowing through said throughflow channel;

switch means operatively associated with a predetermined position of said spindle body and operatively connected to said control valve; and said spindle body, in said predetermined position in said throughflow channel of said housing during said branch-off partial ink flow, acting upon said switch means and thereby operating said control valve for passing said solvent from said solvent reservoir to said main ink reservoir until the ink viscosity of said branched-off partial ink flow through said throughflow channel in said housing is reduced to said predetermined ink viscosity.

6. The apparatus as defined in claim 5, wherein:

said throughflow channel of said cavity in said housing extending substantially in vertical direction; and guide means for guiding said spindle body for substantially upwardly and downwardly directed movements in said throughflow channel of said housing due to said variations in said ink viscosity of said branched-off partial ink flow flowing through said throughflow channel.

7. The apparatus as defined in claim 5, wherein:
at least said housing, said spindle body and said switch means constitute an independent structural unit operatively associated with said main ink reservoir.

8. The apparatus as defined in claim 7, wherein:
said housing contains a top portion
said top portion being provided with an annular channel separated from said throughflow channel by a substantially weir-like rim portion which defines a predetermined ink level in said housing; and
said annular channel being connected to said main ink reservoir through a housing bore and an outlet aperture connected to said ink return conduit.

9. The apparatus as defined in claim 6, wherein:
said spindle body is substantially centrally guided in said throughflow channel of said housing for said substantially upwardly and downwardly directed movements in response to said variations in the ink viscosity of the branched-off partial ink flow flowing through said throughflow channel;
said spindle body containing a top portion; and
said top portion of said spindle body containing a push rod operatively associated with said switch means in said predetermined position of said spindle body in said throughflow channel of said housing.

10. The apparatus as defined in claim 9, wherein:
said spindle body is rheologically constructed such that said spindle body, under the conditions of substantially constant ink viscosity but varying ink level in said housing, is adjustable to assume a further predetermined position in which said push rod at the top region of said spindle body is spaced from said switch means.

11. The apparatus as defined in claim 5, wherein:
said housing containing said throughflow channel for said branched-off partial ink flow and said switch means for a structural unit integrated into said main ink reservoir; and said housing being bounded by a top weir-like rim portion.

12. The apparatus as defined in claim 11, wherein:
said spindle body is substantially centrally guided in said throughflow channel of said housing for substantially upwardly and downwardly directed movements in response to said variations in the ink viscosity of the branched-off partial in flow flowing through said throughflow channel;
said spindle body containing a top portion; and
said top portion of said spindle body containing a push rod acting upon said switch means in said predetermined position of said spindle body in said throughflow channel of said housing.

13. The apparatus as defined in claim 12, wherein:
said spindle body is rheologically constructed such that said spindle body, under the conditions of substantially constant ink viscosity but varying ink level in said housing, is adjustable to a further predetermined position in which said push rod at the top region of said spindle body is spaced from said switch means.

14. The apparatus as defined in claim 10, wherein:
said switch means constitute a proximity switch; and
said proximity switch being positionally adjustable relative to said push rod at the top region of said spindle body.

15. The apparatus as defined in claim 13, wherein:
said switch means constitute a proximity switch; and
said proximity switch being positionally adjustable relative to said push rod at the top region of said spindle body.

16. The apparatus as defined in claim 5, further including:
an ink level monitoring element associated with said main ink reservoir; and
common interrogating means operatively connected with said ink level monitoring element and said switch means.

17. The apparatus as defined in claim 5, wherein:
said throughflow channel interconnects said ink supply conduit and said return conduit in said housing.

* * * * *